United States Patent [19]
Enders

[11] Patent Number: 6,010,296
[45] Date of Patent: Jan. 4, 2000

[54] SEAT STOWAGE CART FOR A REMOVABLE VEHICLE SEAT

[76] Inventor: Bruce G. Enders, 192 Stanhope Rd., Sparta, N.J. 07871

[21] Appl. No.: 08/982,543

[22] Filed: Dec. 2, 1997

[51] Int. Cl.[7] ....................................................... B60P 1/24
[52] U.S. Cl. ........................... 414/346; 414/347; 414/471; 414/495
[58] Field of Search ................................... 414/345, 346, 414/347, 373, 495, 471, 589

[56] References Cited

U.S. PATENT DOCUMENTS

| | | | |
|---|---|---|---|
| 2,792,079 | 5/1957 | Gibson | 414/345 X |
| 3,419,164 | 12/1968 | O'Neill | 414/345 |
| 3,623,617 | 11/1971 | Nemessanyi | 414/495 X |
| 4,321,004 | 3/1982 | Mills | 414/345 X |
| 4,632,627 | 12/1986 | Swallows . | |
| 4,752,177 | 6/1988 | Zenna | 414/495 |
| 4,915,567 | 4/1990 | Ellingsen | 414/345 |
| 5,105,915 | 4/1992 | Gary | 414/495 X |
| 5,120,017 | 6/1992 | Feener, II . | |
| 5,135,350 | 8/1992 | Eelman et al. | 414/347 X |
| 5,322,496 | 6/1994 | Ernst et al. | 414/346 X |
| 5,362,125 | 11/1994 | Peak . | |
| 5,413,449 | 5/1995 | Schoenherr et al. | 414/346 X |
| 5,417,541 | 5/1995 | Herron . | |
| 5,593,271 | 1/1997 | Hall . | |
| 5,595,470 | 1/1997 | Berkey et al. | 414/495 |
| 5,911,465 | 6/1999 | Yamamoto et al. | 414/537 X |

FOREIGN PATENT DOCUMENTS 804779  4/1951  Germany ................................ 414/346

*Primary Examiner*—Robert P. Olszewski
*Assistant Examiner*—Gerald O'Connor
*Attorney, Agent, or Firm*—Gibbons, Del Deo, Dolan, Griffinger & Vecchione

[57] ABSTRACT

A seat stowage cart enables loading, transporting, and stowing a removable vehicle seat of the type found in sport utility vehicles. The seat is drawn manually upon a pair of ramps which pivot on a frame. The seat passes over the pivot axis, urging the ramps toward a seat stowage position, therein supported by a pair of support members. The ramps are adjustable for seats of varying width. The frame is selectively variable in height, and includes wheels. A pawl is provided for releasably locking the ramps against pivoting, and for blocking the seat wheels from rolling.

20 Claims, 5 Drawing Sheets

SEAT STOWAGE CART FOR A REMOVABLE VEHICLE SEAT

FIELD OF THE INVENTION

This invention relates to the field of loader and transport carts, and more particularly to the field of carts for loading, transporting, and stowing a removable vehicle seat of the type found in vans, mini-vans, and sport utility vehicles.

BACKGROUND OF THE INVENTION

Sport utility vehicles that have become popular in recent years are intended for multi-purpose use. They carry passengers in front seats, and in one or more rear bench type seats. The bench seat is mounted on skids or wheels and is removably attached to the vehicle floor. The bench seat can be removed to create interior vehicle space for transporting cargo or sleeping. The bench seat can later be reinstalled in the vehicle for once again conveying passengers. The repeated removal and reinstallation of the large, bulky, and heavy bench seat causes problems for a physically fit man, and more so for a woman or the elderly. The risks include scratching or denting the vehicle, tearing the seat upholstery, dropping the seat on oneself or a child, lower back injury, or other muscle or joint problems. While in storage on a garage floor or other location, the seat wheels or mounting skids can pick up dirt and grease, which is then transferred to the vehicle carpet as well as can interfer with proper operation of the latching mechanism. The stored seat poses a trip hazard on the floor.

Accordingly, there is a need to provide a seat stowage cart that will enable a person of modest physical ability to easily remove, transport, and reinstall a vehicle seat.

A further need is to provide a seat stowage cart that will enable a person to handle the seat without risk of personal injury.

A yet further need is to provide a seat stowage cart that will enable handling of the seat without damage to the seat or the vehicle.

A still further need is to provide a seat stowage cart with which to store the seat without getting it dirty or posing a trip hazard.

SUMMARY OF THE INVENTION

In accordance with the present invention, there is provided a seat stowage cart for use in connection with a vehicle having a floor and a vehicle seat removably attached to the vehicle floor, the seat stowage cart comprising: a frame; a ramp having opposite first and second ends, and upper and lower surfaces, the ramp being pivotally mounted to the frame on a transverse pivot axis, the ramp first end extending toward the vehicle and aligned with the vehicle floor when the cart is in an operating location juxtaposed with the vehicle, so that the seat will be detached from the vehicle floor, the seat will engage the ramp first end, the seat will be drawn manually toward the ramp second end, and the seat will pass over the ramp pivot axis thereby urging the ramp toward a generally horizontal seat stowage position; a terminal element attached to the ramp upper surface at the ramp second end to prevent movement of the seat beyond the ramp second end; limiting means for limiting pivotal movement of the ramp when the seat is urging the ramp toward the seat stowage position; and a plurality of cart wheels attached to the frame so that the seat stowage cart and vehicle seat will be readily moved to a stowage location.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use as a cart for loading, transporting, and stowing a removable vehicle seat of the type found in vans, mini-vans, and sport utility vehicles, and shall be described with respect to this application, the methods and apparatus disclosed here can be applied to other vehicles having a removable bench seat.

Figure 1:
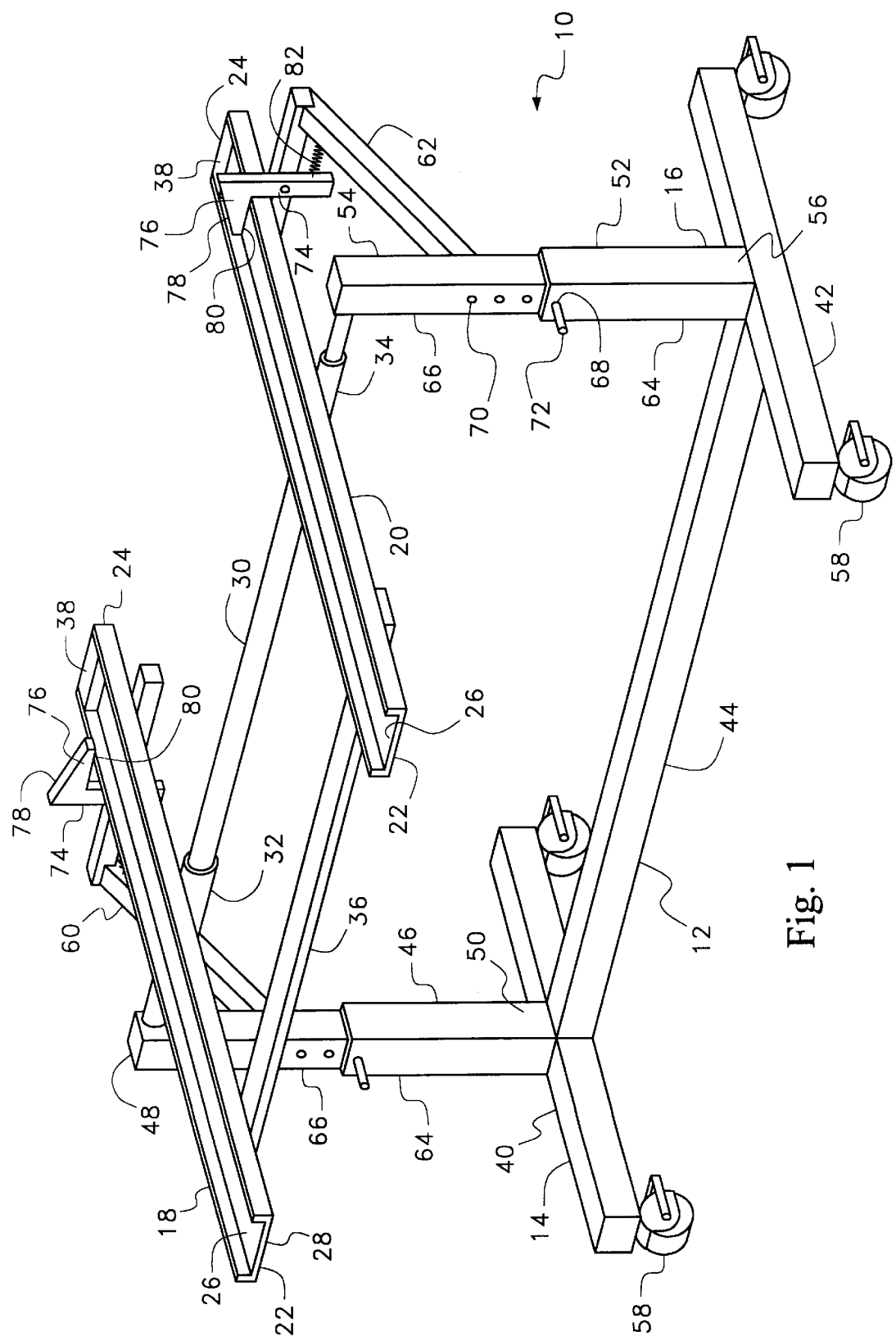
FIG. 1 is a perspective view of a seat stowage cart constructed in accordance with the invention.
Figure 2:
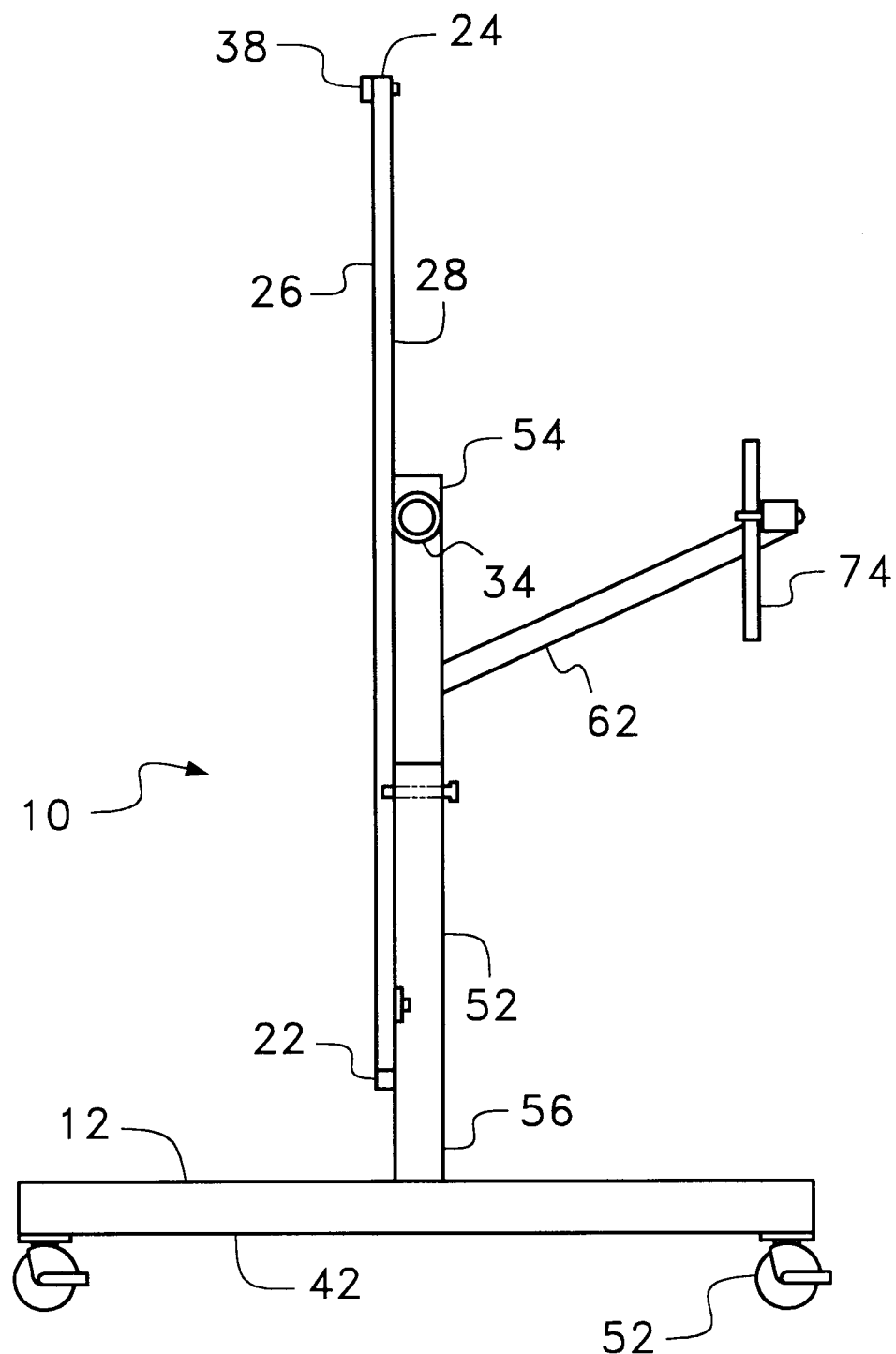
FIG. 2 is a left side elevational view of the seat stowage cart of FIG. 1.
Figure 3:
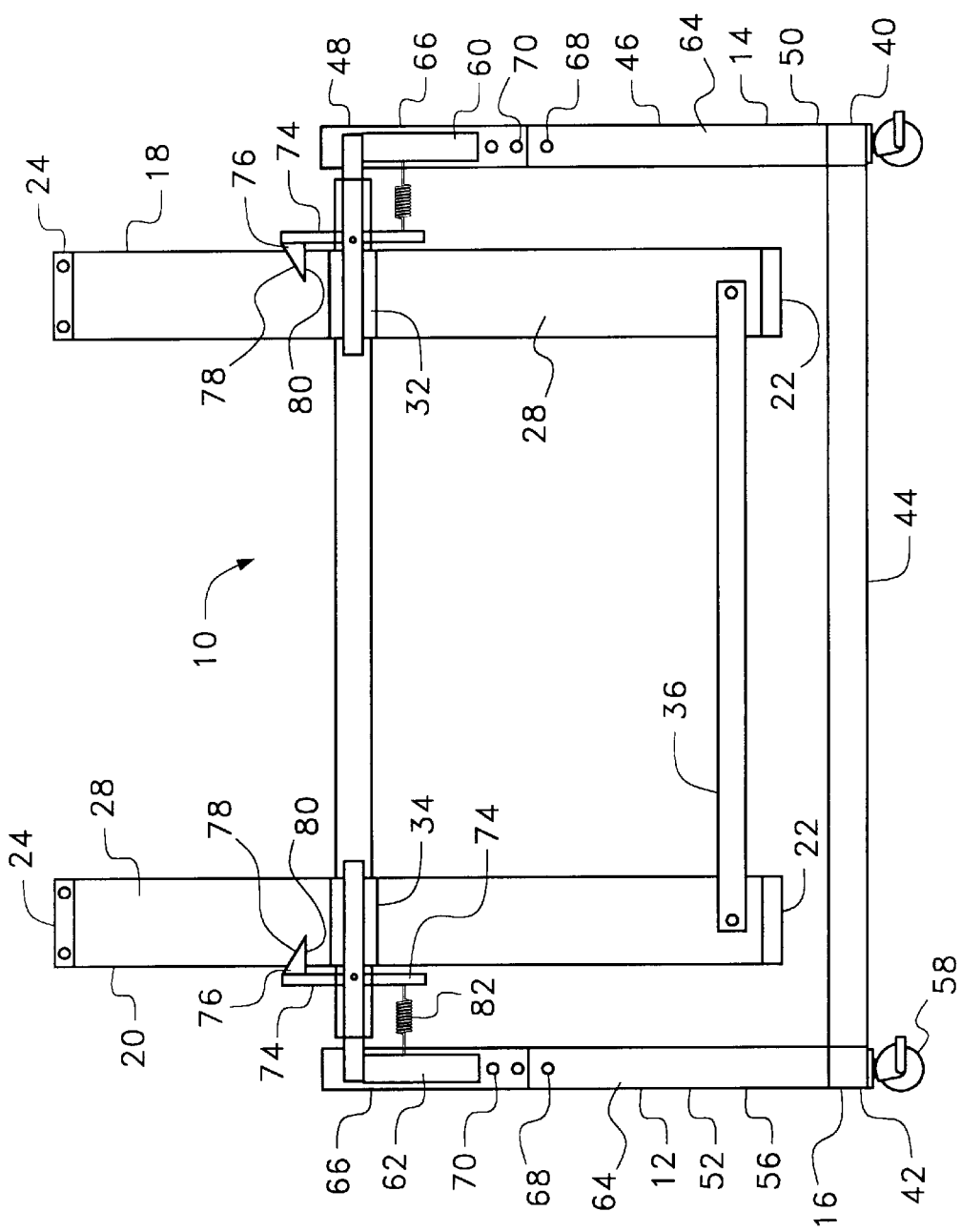
FIG. 3 is a rear elevational view of the seat stowage cart of FIG. 1.

Referring now to the drawings, and especially to FIGS. 1, 2, and 3, a seat stowage cart is shown at 10, and comprises a frame 12 having a right side 14 and a left side 16, and a pair of ramps, including a right ramp 18 and a left ramp 20, each ramp having opposite first 22 and second 24 ends, and upper 26 and lower 28 surfaces. The ramps 18 and 20 pivot with respect to the frame 12 on a common transverse pivot axis. Each ramp first end 22 extends toward the vehicle 84 and is aligned with the vehicle floor 86 when the cart 10 is in an operating location juxtaposed with the vehicle 84, as shown in FIG. 4.

Figure 4:
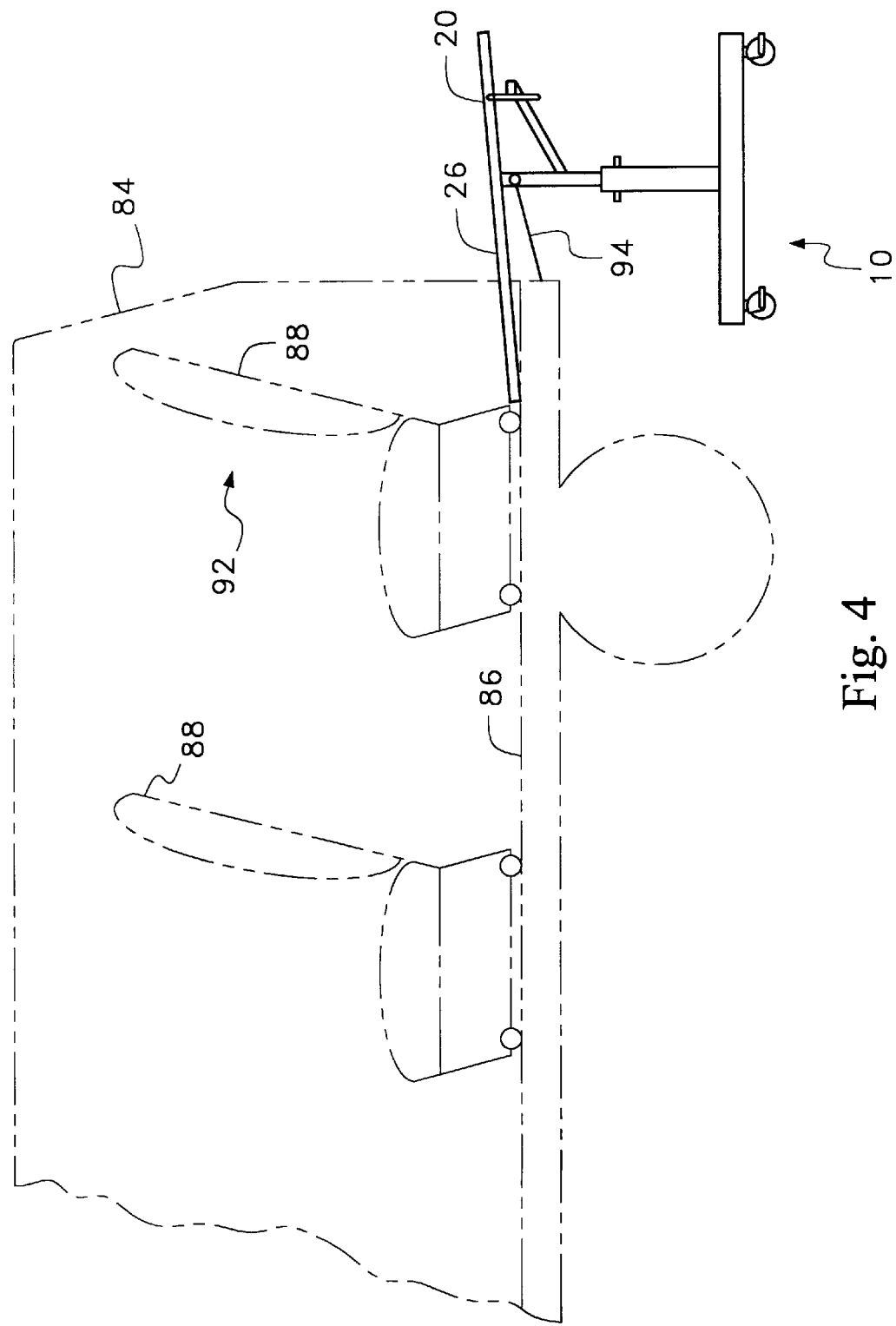
FIG. 4 is a left side elevational view of the seat stowage cart of FIG. 1, showing the cart in use in connection with a vehicle.
Figure 5:
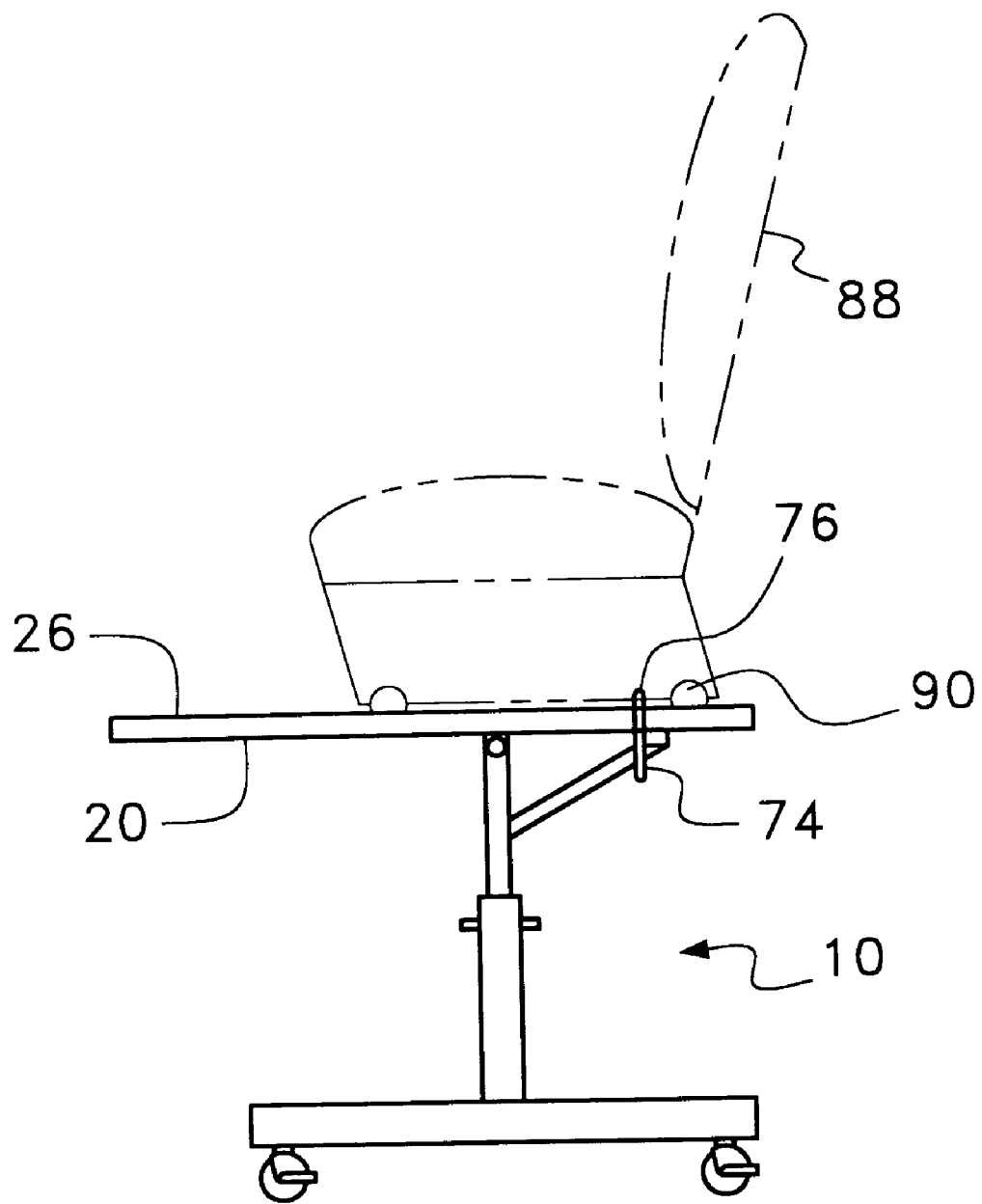
FIG. 5 is a left side elevational view of the seat stowage cart of FIG. 1, showing the cart in use with a vehicle seat in the seat stowage position upon the cart.

At this point the seat 88 will be detached from the vehicle floor 86, and manually pulled backward in the vehicle, as shown by arrow 92 in FIG. 4, until the seat 88 engages the first ends 22 of the ramps 18 and 20. Then the seat 88 will be drawn manually upon the ramps 18 and 20, and toward the second ends 24 of the ramps 18 and 20. Along the way, the seat 88 will pass over the pivot axis of the ramps 18 and 20, the weight of the seat 88 thereby urging the ramps 18 and 20 toward a seat stowage position as shown in FIG. 5. In this position, the second ends 24 are slightly lower than the first ends 22 so that gravity will prevent the seat 88 from moving toward the first ends 22.

An axle 30 extends along the pivot axis, and is attached to the frame 12. A pair of sleeves slideably engage the axle 30 and are interposed between the axle 30 and the ramps 18 and 20, including a right sleeve 32 attached to the right ramp 18, and a left sleeve 34 attached to the left ramp 20. The sleeves allow the ramps 18 and 20 to be adjustable in position by sliding along the axle 30, to accommodate vehicle seats of varying width.

A tie bar 36 connects the right 18 and left 20 ramps so that the ramps will pivot together. A pair of terminal elements 38 are provided, including one terminal element attached to each ramp upper surface 26 at the second end 24 to prevent movement of the seat 88 beyond the second ends 24 of the ramps 18 and 20.

The frame 12 further comprises a right base member 40 and a left base member 42. A connecting member 44 is connected between the right 40 and left 42 base members. The right 40 and left 42 base members and connecting member 44 lie within a generally horizontal base plane. A right upright member 46 extends between opposite upper 48 and lower 50 ends. The right lower end 50 is attached to the right base member 40, and the right upper end 48 is attached to the axle 30. A left upright member 52 extends between opposite upper 54 and lower 56 ends. The left lower end 56 is attached to the left base member 42, and the left upper end 54 is attached to the axle 30.

The seat stowage cart 10 is constructed preferably from welded steel or aluminum, although a composite material such as fiberglass as well as other suitable materials may be used. The frame can be made from structural tubing. The ramps are channels, as depicted in FIG. 1, with the flanges upward to prevent the seat from sliding or rolling off. Anti-friction bearings can be installed at the pivot points.

A plurality of cart wheels 58 are attached to the frame 12 so that the seat stowage cart 10 and vehicle seat 88 will be readily moved to a stowage location. Typically, four wheels will be used. Two cart wheels 58 are pivotally mounted to the frame right base member 40 on a generally vertical pivot axis, and two cart wheels 58 are pivotally mounted to the frame left base member 42 on a generally vertical pivot axis, so that the wheels 58 will roll in any direction. At least one of the cart wheels 58 on each of the right 40 and left 42 base members includes a parking brake to prevent inadvertent movement of the cart.

The seat stowage cart 10 includes limiting means for limiting pivotal movement of the ramps 18 and 20 when the seat 88 is urging the ramps 18 and 20 toward the seat stowage position. The means for limiting pivotal movement of the ramps 18 and 20 includes a pair of support members, including a right support member 60 attached to the right upright member 46. The right support member 60 contacts the lower surface 28 of the right ramp 18 between the pivot axis and the second end 24 when the ramps 18 and 20 are in the seat stowage position. A left support member 62 is attached to the left upright member 52, the left support member contacting the lower surface 28 of the left ramp 20 between the pivot axis and the second end 24 when the ramps 18 and 20 are in the seat stowage position. In this position, the support members 60 and 62 will prevent the second ends 24 of the ramps 18 and 20 from dropping below the seat stowage position as shown in FIGS. 1 and 5.

The upright members 46 and 52 are selectively variable in height, in order to adjust the ramps 18 and 20 into alignment with the vehicle floor 86. This variable height feature can take any number of forms, including jacks, pneumatic cylinders, etc., or telescoping tubes as described next. In order to accomplish this, each member of the pair of right 46 and left 52 upright members further comprises a first tubular element 64 having at least one transverse hole 68. A second tubular element 66 slideably engages the first tubular element 64, the second tubular element 66 having a plurality of transverse holes 70 spaced apart longitudinally. It makes no difference which tube is internal and which is external, or which tube has the plurality of holes. A pin 72 selectively engages one of the holes in each of the first 64 and second 66 tubular elements, in order to adjust the ramps 18 and 20 into alignment with the vehicle floor 86.

Locking means is provided for releasably locking the ramps 18 and 20 against inadvertent upward movement of the second ends 24 of the ramps and pivoting of the ramps, so as to prevent movement of the seat 88 toward the first ends 22 of the ramps. The ramps 18 and 20 pivot in an arcing path from an inclined position, wherein the second ends 24 are higher than the first ends 22, into the seat stowage position, which is generally horizontal. The locking means comprises a pawl 74 pivotally mounted on either one of the support members 60 or 62. The pawl includes a projecting member 76 having a first surface 78 projecting at an angle into the path of one of the ramps. As the ramp pivots, the lower surface 28 contacts the angled first surface 78, creating a sideways force such that the pawl 74 pivots away from the ramp in response to the ramp movement toward the seat stowage position, allowing the ramp to pass by the pawl 74 into the seat stowage position. The projecting member 76 includes a second surface 80 projecting generally perpendicularly to the path of the ramp. No sideways force is generated when the ramp contacts the second surface 80. Thus the pawl 74 will not pivot in response to the ramp moving away from the seat stowage position. Consequently, the projecting member 76 will releasably lock the ramp in the seat stowage position until the pawl 74 is manually pivoted away from the ramp. A spring 82 is provided to bias the pawl 74 toward the ramp.

Some vehicle rear seats are mounted on skids, which must slide upon the ramp. To facilitate this, the upper surface 26 can be coated with an anti-friction material such as polyethylene or teflon. Other vehicle rear seats include seat wheels 90 to support and facilitate removal of the seat, as shown in FIGS. 4 and 5.

As an added safety feature, the projecting member 76 will project at least part way across the upper surface 26 of one of the ramps adjacent one of the seat wheels 90, typically in front of the rearmost wheel, as shown in FIG. 5. This will releasably block the seat wheel 90 from rolling, and thereby prevent inadvertent movement of the seat 88 toward the ramp first end 22.

While the seat 88 is shown in FIG. 5 with a seat back in an upright position, it is desirable to fold or collapse the seat back where the particular type of the seat 88 permits. Folding or collapsing of the seat back from the upright position will lower the center of gravity of the combined seat stowage cart 10 and seat 88, thereby improving stability.

For convenience, the ramps 18 and 20 are able to pivot into a generally vertical ramp storage position as shown in FIG. 2. Thus, the ramps will occupy minimal storage space when the seat stowage cart 10 is not in use.

An optional securing means 94 is provided for releasably securing the cart to the vehicle to further prevent inadvertent movement of the cart from the operating location as shown in FIG. 4. This can be a strap with a hook to engage the vehicle trunk lid catch or the bumper.

Numerous modifications and alternative embodiments of the invention will be apparent to those skilled in the art in view of the foregoing description. Accordingly, this description is to be construed as illustrated only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. A seat stowage cart for use in connection with a vehicle having a floor and a vehicle seat removably attached to the vehicle floor, the seat stowage cart comprising:

a frame;

a ramp having opposite first and second ends, and upper and lower surfaces, the ramp being pivotally mounted to the frame on a transverse pivot axis, the ramp first end extending toward the vehicle and aligned with the vehicle floor when the cart is in an operating location juxtaposed with the vehicle, so that the seat will be detached from the vehicle floor, the seat will engage the ramp first end, the seat will be drawn manually toward the ramp second end, and the seat will pass over the ramp pivot axis thereby urging the ramp toward a generally horizontal seat stowage position;

a terminal element attached to the ramp upper surface at the ramp second end to prevent movement of the seat beyond the ramp second end;

limiting means for limiting pivotal movement of the ramp when the seat is urging the ramp toward the seat stowage position; and a plurality of cart wheels attached to the frame so that the seat stowage cart and vehicle seat will be readily moved to a stowage location.

2. The seat stowage cart as recited in claim 1, wherein the frame further comprises:

a base portion lying within a generally horizontal base plane;

an upright member extending between opposite upper and lower ends, the lower end attached to the base portion, the upper end including the pivotal attachment of the ramp to the frame.

3. The seat stowage cart as recited in claim 2, wherein the means for limiting pivotal movement of the ramp includes a support member attached to the frame and contacting the ramp lower surface between the pivot axis and the ramp second end when the ramp is in the seat stowage position, so as to prevent the ramp second end from dropping below the seat stowage position.

4. The seat stowage cart as recited in claim 3, further comprising locking means for releasably locking the ramp against inadvertent upward movement of the ramp second end and pivoting of the ramp so as to prevent movement of the seat toward the ramp first end.

5. The seat stowage cart as recited in claim 4, wherein the upright member is selectively variable in height, in order to adjust the ramp into alignment with the vehicle floor.

6. The seat stowage cart as recited in claim 5, wherein the upright member further comprises:

a first tubular element having at least one transverse hole;

a second tubular element slideably engaging the first tubular element, the second tubular element having a plurality of transverse holes spaced apart longitudinally; and a pin selectively engaging one of the holes in each of the first and second tubular elements, in order to adjust the ramp into alignment with the vehicle floor.

7. The seat stowage cart as recited in claim 6, wherein the means for locking the ramp comprises:

a pawl pivotally mounted on the support member, the ramp pivoting in an arcing path from an inclined position, wherein the second end is higher than the first end, into the seat stowage position, the pawl including a projecting member having a first surface projecting at an angle into the path of the ramp; such that the pawl pivots away from the ramp in response to the ramp movement toward the seat stowage position, allowing the ramp to pass by the pawl into the seat stowage position; and the projecting member includes a second surface projecting generally perpendicularly to the path of the ramp; such that the pawl will not pivot in response to the ramp moving away from the seat stowage position, whereby the projecting member will releasably lock the ramp in the seat stowage position.

8. The seat stowage cart as recited in claim 7, wherein:

each cart wheel is pivotally mounted to the frame base portion on a generally vertical pivot axis, so that the cart wheels will roll in any direction; and at least one of the cart wheels includes a parking brake to prevent inadvertent movement of the cart.

9. The seat stowage cart as recited in claim 8, further comprising securing means for releasably securing the cart to the vehicle to further prevent inadvertent movement of the cart from the operating location.

10. A seat stowage cart for use in connection with a vehicle having a floor and a vehicle seat removably attached to the vehicle floor, the seat stowage cart comprising:

a frame having a right side and a left side;

a pair of ramps, including a right ramp and a left ramp, each ramp having opposite first and second ends, and upper and lower surfaces, the ramps pivoting with respect to the frame on a common transverse pivot axis, each ramp first end extending toward the vehicle and aligned with the vehicle floor when the cart is in an operating location juxtaposed with the vehicle, so that the seat will be detached from the vehicle floor, the seat will engage the first ends of the ramps, the seat will be drawn manually toward the second ends of the ramps, and the seat will pass over the pivot axis of the ramps, thereby urging the ramps toward a seat stowage position wherein the second ends are slightly lower than the first ends so as to prevent the seat from moving toward the first ends;

an axle extending along the pivot axis, the axle being attached to the frame;

a pair of sleeves slideably engaging the axle and interposed between the axle and the ramps, including a right sleeve attached to the right ramp, and a left sleeve attached to the left ramp, such that the ramps will be adjustable in position along the axle, to accommodate vehicle seats of varying width;

a tie bar connecting the right and left ramps so that the ramps will pivot together;

a pair of terminal elements, including one terminal element attached to each ramp upper surface at the second end to prevent movement of the seat beyond the second ends of the ramps;

limiting means for limiting pivotal movement of the ramps when the seat is urging the ramps toward the seat stowage position; and a plurality of cart wheels attached to the frame so that the seat stowage cart and vehicle seat will be readily moved to a stowage location.

11. The seat stowage cart as recited in claim 10, wherein the frame further comprises:

a right base member;

a left base member;

a connecting member connected between the right and left base members, the right and left base members and connecting member forming a base portion lying within a generally horizontal base plane;

a right upright member extending between opposite upper and lower ends, the lower end attached to the right base member, the upper end attached to the axle; and a left upright member extending between opposite upper and lower ends, the lower end attached to the left base member, the upper end attached to the axle.

12. The seat stowage cart as recited in claim 11, wherein the means for limiting pivotal movement of the ramps includes a pair of support members, including:

a right support member attached to the right upright member, the right support member contacting the lower surface of the right ramp between the pivot axis and the second end when the ramps are in the seat stowage position; and a left support member attached to the left upright member, the left support member contacting the lower surface of the left ramp between the pivot axis and the second end when the ramps are in the seat stowage position, so as to prevent the second ends of the ramps from dropping below the seat stowage position.

13. The seat stowage cart as recited in claim 12, further comprising locking means for releasably locking the ramps against inadvertent upward movement of the second ends of the ramps and pivoting of the ramps, so as to prevent movement of the seat toward the first ends of the ramps.

14. The seat stowage cart as recited in claim 13, wherein the upright members are selectively variable in height, in order to adjust the ramps into alignment with the vehicle floor.

15. The seat stowage cart as recited in claim 14, wherein each member of the pair of right and left upright members further comprises:

a first tubular element having at least one transverse hole;

a second tubular element slideably engaging the first tubular element, the second tubular element having a plurality of transverse holes spaced apart longitudinally; and a pin selectively engaging one of the holes in each of the first and second tubular elements, in order to adjust the ramp into alignment with the vehicle floor.

16. The seat stowage cart as recited in claim 15, wherein the means for locking the ramps includes:

a pawl pivotally mounted on one of the support members, the ramps pivoting in an arcing path from an inclined position, wherein the second ends are higher than the first ends, into the seat stowage position, the pawl including a projecting member having a first surface projecting at an angle into the path of one of the ramps; such that the pawl pivots away from the ramp in response to the ramp movement toward the seat stowage position, allowing the ramp to pass by the pawl into the seat stowage position; and the projecting member includes a second surface projecting generally perpendicularly to the path of the ramp; such that the pawl will not pivot in response to the ramp moving away from the seat stowage position, whereby the projecting member will releasably lock the ramp in the seat stowage position; and a spring, the spring biasing the pawl toward the ramp.

17. The seat stowage cart as recited in claim 16, wherein:

the vehicle seat includes seat wheels to support and move the seat; and the projecting member will project at least part way across the upper surface of one of the ramps adjacent one of the seat wheels, so as to releasably block the seat wheel from rolling, and thereby prevent inadvertent movement of the seat toward the ramp first end.

18. The seat stowage cart as recited in claim 17, wherein:

two cart wheels are pivotally mounted to the frame right base member on a generally vertical pivot axis;

two cart wheels are pivotally mounted to the frame left base member on a generally vertical pivot axis, so that the wheels will roll in any direction; and at least one of the cart wheels on each of the right and left base members includes a parking brake to prevent inadvertent movement of the cart.

19. The seat stowage cart as recited in claim 18, wherein the ramps are able to pivot into a generally vertical ramp storage position, so that the ramps will occupy minimal storage space when the seat stowage cart is not in use.

20. The seat stowage cart as recited in claim 19, further comprising securing means for releasably securing the cart to the vehicle to further prevent inadvertent movement of the cart from the operating location.

* * * * *